P. H. SPRACKLEN.
COMPENSATING HINGE JOINT FOR ARTIFICIAL LIMBS.
APPLICATION FILED AUG. 12, 1919.
1,366,136.
Patented Jan. 18, 1921.
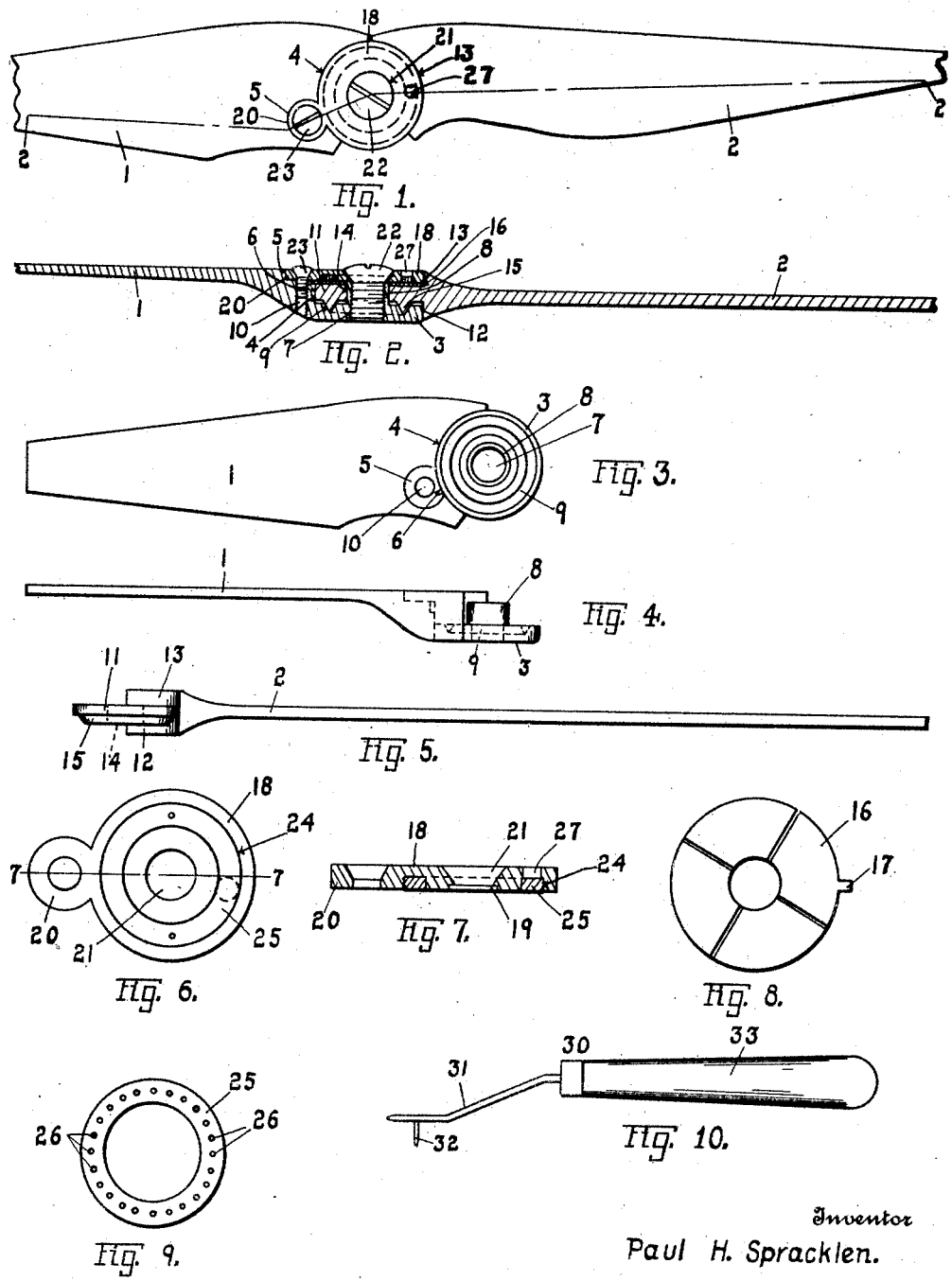
Inventor
Paul H. Spracklen.
By Harry C. Schroeder
Attorney

UNITED STATES PATENT OFFICE.

PAUL H. SPRACKLEN, OF OAKLAND, CALIFORNIA.

COMPENSATING HINGE-JOINT FOR ARTIFICIAL LIMBS.

1,366,136.  Specification of Letters Patent.  Patented Jan. 18, 1921.

Application filed August 12, 1919. Serial No. 316,977.

*To all whom it may concern:*

Be it known that I, PAUL H. SPRACKLEN, a citizen of the United States, residing at Oakland, in the county of Alameda and State of California, have invented certain new and useful Improvements in Compensating Hinge-Joints for Artificial Limbs, of which the following is a specification.

My invention is a compensating hinge joint for artificial limbs including fine adjusting means for tightening the joint to take up the wear thereof.

My invention is illustrated in the accompanying drawing which forms a part of this specification and the appended claims.

Referring to the drawing:

Figure 1 is a side elevation of my invention.

Fig. 2 is a sectional view of my invention taken on line 2—2 of Fig. 1.

Fig. 3 is a plan view of one of the hinge joint members.

Fig. 4 is a side view of the hinge joint member shown in Fig. 3.

Fig. 5 is a side view of the other hinge joint member.

Fig. 6 is a plan of the joint end thrust bearing.

Fig. 7 is a cross section of the end thrust bearing taken on line 7—7 of Fig. 6.

Fig. 8 is a plan of the joint washer.

Fig. 9 is a plan of the joint adjusting nut.

Fig. 10 is a side view of the wrench which may be used in assembling the joint and for adjusting the joint.

In the drawings 1 indicates one hinge member and 2 the other hinge member of a hinge embodying my invention. The member 1 is formed with a hinge knuckle 3 offset at the rear side thereof, leaving an arcuate edge 4 concentric to the center of the knuckle, and with a recess 5 and a notch 6 extending from the edge 4, in the front side of the member, the notch 6 being located in the recess. The knuckle 3 has a central threaded opening 7 and is formed with an upstanding central sleeve 8 extending from the inner surface thereof, the opening 7 extending through the sleeve. In the inner surface of the knuckle 3 is formed an annular V-shaped bearing groove 9 surrounding the sleeve 8 concentric with the sleeve and the center of the knuckle. The knuckle is provided with a threaded aperture 10 extending through the bottom of the recess 5.

The member 2 is formed with a hinge knuckle 11 substantially in alinement with the member, leaving arcuate edges 12 and 13 at the rear and front sides of the knuckle concentric with the center of the knuckle. Said knuckle is provided with a central opening 14 through which the sleeve 8 extends, and a V-shaped annular bearing tongue 15 extends from the rear surface of the knuckle concentric with the center thereof and fits in the groove 9 of knuckle 3, thus forming the hinge bearing, the edge of the knuckle 3 fitting the arcuate wall 12 of member 2. A washer 16 fits over the end of sleeve 8 upon the front surface of knuckle 11 and has a tongue 17 which fits in notch 6 to prevent the washer from turning. An end thrust bearing 18 fits over the end of the sleeve 8 upon washer 16, being provided with a recess 19 to receive the end of the sleeve, and has an eye 20 at one side which fits in the recess 5, the edge of the bearing fitting within the arcuate edges 4 and 13 of members 1 and 2. The bearing 18 is provided with a central opening 21 through which extends a screw 22 which screws into the sleeve 8, the opening 21 being shaped to countersink the head of said screw in the outer front surface of the bearing, thus holding the bearing in position upon the members 1 and 2 against the washer 16. A screw 23 extends through eye 20 and screws into the aperture 10, the head of the screw being countersunk in the outer front face of the eye, thus holding the eye firmly in the recess 5.

An internally threaded annular recess 24 is provided in the inner side of bearing 18, into which screws an externally threaded ring shaped end thrust bearing nut 25. The nut 25 is provided with a series of indentations 26 arranged closely together in a circle in the outer side of the nut, which indentations register with an aperture 27 in the front face of the bearing 18 into the recess 24, the aperture being large enough to uncover two indentations at a time. A wrench 30 may be used for assembling and adjusting the hinge joint. The wrench has a screw engaging member 31 and a pin 32 extending laterally from member 31. A handle 33 is secured on the member 31 for operating the wrench. The screws 22 and 23 may be screwed into position by the member 31 of the wrench and the pin 32 may be introduced through aperture 27 into the indentations 26 to turn the nut 24 to screw it against the washer 16 to take up wear in the joint bearing groove 9 and tongue 15, thus tightening the joint and compensating for the wear thereof.

Having described my invention, I claim:

1. A hinge joint including hinge knuckles, bearing means between said knuckles, an end thrust bearing resting upon one of said knuckles, a screw extending through said bearing into the other knuckle, an end thrust nut screwing into said end thrust bearing on the inside thereof, and means whereby said nut may be turned.

2. A hinge joint including hinge knuckles, bearing means between said knuckles, an end thrust bearing resting upon one of said knuckles, a screw extending through said bearing into the other knuckle, an end thrust nut screwing into said end thrust bearing on the inside thereof, said nut being provided with indentations in the outer side thereof, said end thrust bearing being provided with an aperture with which said indentations register.

3. A hinge joint including hinge knuckles, bearing means between said knuckles, an end thrust bearing resting upon one of said knuckles, a screw extending through said bearing into the other knuckle, an end thrust nut screwing into said end thrust bearing on the inside thereof, the knuckle into which said screw is screwed being provided with a recess, a projection on said bearing fitting in said recess, and means whereby said nut may be turned.

4. A hinge joint including hinge knuckles, bearing means between said knuckles, an end thrust bearing resting upon one of said knuckles, a screw extending through said bearing into the other knuckle, an end thrust nut screwing into said end thrust bearing on the inside thereof, the knuckle into which said screw is screwed being provided with a recess, an eye on said bearing fitting in said recess, a screw extending through said eye into said recess, and means whereby said nut may be turned.

5. A hinge joint including knuckles, a threaded central sleeve on one of said knuckles, said knuckle being provided with a V-shaped annular groove concentric with said sleeve, the other knuckle having a central opening through which said sleeve extends, a V-shaped annular tongue on said knuckle fitting in said V-shaped groove, a bearing resting upon said latter knuckle, a screw extending through said bearing into said sleeve, a nut screwing into the inside of said bearing, means for turning said nut.

In testimony whereof I affix my signature.

PAUL H. SPRACKLEN.